United States Patent [19]

Cuypers

[11] Patent Number: 4,998,908
[45] Date of Patent: Mar. 12, 1991

[54] TRANSMISSION CHAIN FOR A CONTINUOUSLY VARIABLE CONICAL PULLEY DRIVE

[75] Inventor: Martinus H. Cuypers, Eindhoven, Netherlands

[73] Assignee: Van Doorne's Transmissie B.V., Tilburg, Netherlands

[21] Appl. No.: 418,860

[22] Filed: Oct. 10, 1989

[30] Foreign Application Priority Data

Oct. 31, 1988 [NL] Netherlands .................... 8802669

[51] Int. Cl.$^5$ .............................................. F16G 1/24
[52] U.S. Cl. .................................................. 474/245
[58] Field of Search ..................... 474/201, 213–217, 474/237, 240, 242, 244, 245, 248

[56] References Cited

U.S. PATENT DOCUMENTS

| | | | |
|---|---|---|---|
| 4,486,185 | 12/1984 | Cataldo | 474/201 |
| 4,569,671 | 2/1986 | Ledvina | 474/201 |
| 4,767,388 | 8/1988 | Tatara et al. | 474/245 |
| 4,795,409 | 1/1989 | Okuwaki et al. | 474/245 |

FOREIGN PATENT DOCUMENTS

| | | |
|---|---|---|
| 0127266 | 5/1984 | European Pat. Off. |
| 3315390 | 11/1984 | Fed. Rep. of Germany |
| 1190849 | 4/1959 | France |
| 2088517 | 6/1982 | United Kingdom |

*Primary Examiner*—Thuy M. Bui
*Attorney, Agent, or Firm*—Webb, Burden, Zieseheim & Webb

[57] ABSTRACT

A transmission chain for a continuously variable conical pulley drive, comprising a plurality of interleaved sets of link-plates for each link, and an associated transverse-plate for each set. Each link-plate has at least two cams (43) per longitudinal side, defining between them a groove (44) with preferably V-shaped sides opening towards the cam-tops. Each associated transverse-plate has a rectangular closed window (54) and longsides (58) shaped correspondingly to the grooves (44). In service, when running through the sheaves of the pulleys, the transverse-plates locate themselves free-of-play in the grooves of the link-plates reducing wear and noise and any tendency for the chain to run out of square. At the straight trajects, play between the transverse-plates and the link-plates is restored again, permitting lube oil to enter.

5 Claims, 6 Drawing Sheets

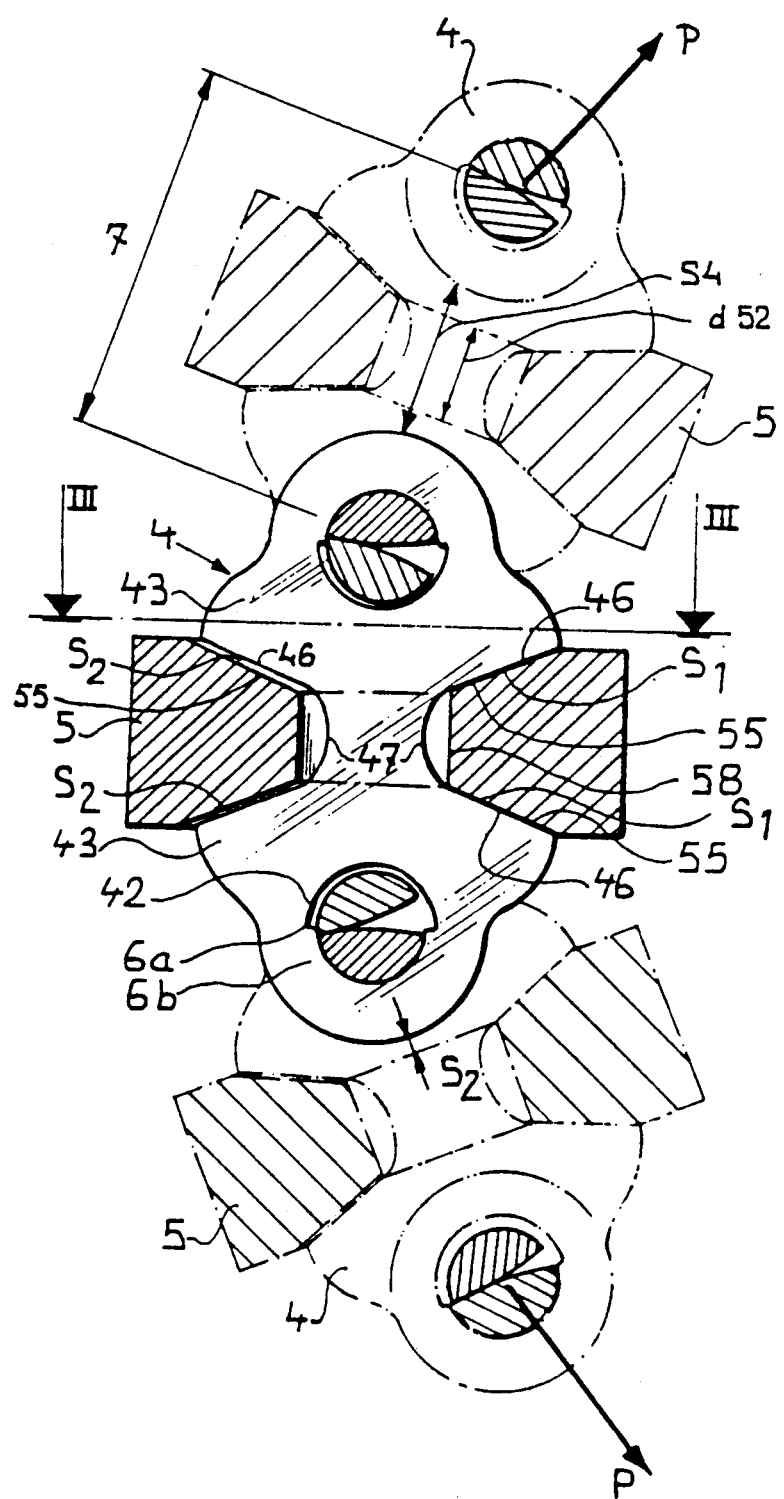

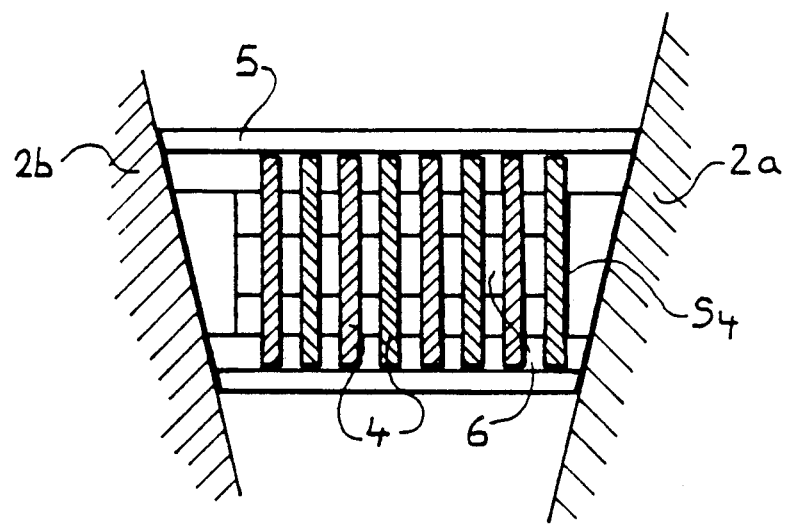

TRANSMISSION CHAIN FOR A CONTINUOUSLY VARIABLE CONICAL PULLEY DRIVE

The invention relates to a transmission chain with a number of links closed to form an endless chain for a continuously variable conical pulley drive, comprising in each link a set of link-plates situated parallel and adjacent to each other, and provided with two link-plate openings situated at pitch distance from each other, hinge pins running at right angles to the link-plate plane and inserted through the adjacent link-plate openings, a link-plate of one link and of the following link being disposed essentially alternately round each hinge pin, while the chain ends are connected to each other to form an endless chain, and also comprising at least one transverse-plate per link, said transverse-plate being essentially of constant thickness and being trapezoidal, and having a rectangular window whose long sides run parallel to the parallel sides of the trapezium, and the short sides of the window being of such length that the adjacent linkplates of a link can be inserted with slight play through the window and are situated at such a distance from each other that the whole set of adjacent link-plates can be accommodated with some play, and in which the two short slanting sides of each transverse-plate form end surfaces which mate as wedge-shaped friction faces with the conical surfaces of the conical pulleys, and in which there are means which confine each transverse-plate in the lengthwise direction of the chain relative to the accommodated set of link-plate which are situated in the link-plate face, and which project on either side of the center of the link-plate and form a groove between them, the centerline of which lies at right angles to the centerline of the link-plate, and in which the greatest width of the link-plate measured between a top of a first cam and a top of a second cam opposite the first cam is smaller than an ablique distance through the window in the transverse-plate during fitting of a set of link-plates in the window of the transverse-plate, while all the link-plates but one are pushed slantingly or vertically next to and against each other to one side of the window in the transverse-plate and the last link-plate can be fed or swung in the abovementioned slanting position parallel to itself into (out of) the window.

A transmission chain of the type described above is known from EP-A-0,127,266. Although in the illustrations of this publication more than one transverse-plate per link is shown, the text specifies that use of only one transverse-plate per link is possible. The transverse-plate or the transverse-plates of each link are confined in the lengthwise direction of the chain by the projecting ends of the hinge pins. This means that the effective pulling force in the chain is transmitted only via the short pieces of line contact between the ends of the hinge pins and the transverse-plates to the latter, following which the pulling force is passed on via the side flanks of the transverse-plates to the conical pulleys of the drive mechanism. It will be clear that this short line contact causes a high Hertz contact stress in the material, and in chains which are intended for a long service life easily leads to inadmissible wear, pitting and play. It should be remembered here that when passing through the driving conical pulley the transverse-plates are pressed with their one side against the hinge pin in front, and on delivering the torque to the other conical pulley after passing through the play, knock with their other side against the hinge pin behind. As a result of this alternate striking of the transverse-plates against the pin in front and the pin behind and passing through the play in the process, so that impact-type load shocks always occur here, not only is the service life substantially reduced, but the noise level is also increased. The transverse-plates can also tilt slightly about the link on which they are mounted. For they have some play between the hinge pins in front and those behind between which they are confined, and the window in the transverse-plate must therefore also have some play in the radial direction relative to the chain over and above the width of the link-plates. Some freedom of movement of the transverse-plates relative to the chain is in itself not undesirable, so that the run of the chain between and round the conical pulleys is as self-centering as possible, without the transverse-plates having an adverse effect thereon, but on the other hand the possibilities for movement of the transverse-plates relative to the chain in the known chain are such that they easily lead to inadmissible plays, going out of square, wear and noise production.

Finally, another disadvantage, which could be of minor importance only in the case of the very greatest accuracy in manufacturing, should be pointed out. What is meant here is the fact that the contact line of the side flanks of the transverse-plates between the flanks of the conical pulleys at the great variety of transmission ratios of the drive mechanism does not easily lie on precisely the same radius as that on which the hinge pins of the chain move at that same moment. If some difference occurs here, which can easily be the case due to inaccurate manufacture or wear occurring during the service life, this exerts a couple on the transverse-plate relative to the link concerned, which forces the transverse-plate to tilt in the running direction relative to the link-plates of the link concerned. It goes without saying that this phenomenon leads to a high degree of extra wear and noise production.

A transmission chain of the type described above is also known from U.S. Pat. No. 4,767,388. This transmission chain has several disadvantages. First, the chain during operation suffers from a relatively high noise level and a high wear ratio. This is caused by the fact that the cooperating surfaces of the link-plates on the one hand and a corresponding transverse-plate on the other hand during operation constantly change. This phenomenon occurs, among other times, when the torque is transferred from the driving pulley to the driven pulley.

The object of the invention is then to eliminate and/or reduce the above-mentioned disadvantages as much as possible. For this purpose, according to the invention the transmission chain mentioned in the preamble is characterized in that the means for confining each transverse-plate relative to the accommodated set of link-plates are formed by two cams per longitudinal side of each link-plate which are situated in the link-plate face, and which project on either side of the centre of the link-plate and form a groove between them, and in that the greatest width of the link-plate measured between the tops of two opposite cams is smaller than the oblique distance through the window in the transverse-plate during fitting (removal) of a set of link-plates in (from) the window of the transverse-plate, while all the link-plates but one are pushed slantingly or vertically next to and against each other to one side of the window in the transverse-plate and the last link-plate is fed or swung in the above-mentioned slanting position parallel to itself in (out of) the window.

(For an explanation of the names used for the chain, the loose link-plates and the loose transverse-plates, see the definitions at the beginning of the description of the figures.)

While retaining rigid closed transverse-plates, link-plates with effective confinement and supporting cams for the transverse-plates can thus be used, because their fitting and removal is ensured. For the radial confinement of the transverse-plates relative to the fitted chain, both the peripheral edges of the window and the bottoms of the grooves in the link-plates, after possible hardening, must be machined smooth and accurate to size.

According to a preferred embodiment, further improvements of the confinement of the transverse-plates on the chain are possible, combined with a simpler shaping and machining of the link-plates. This is characterized in that at least one of the grooves in the link-plates widens in a V-shape towards the top of the cams, and in that the faces of the long sides of each transverse-plate are provided with matching V-shaped side faces, while the innermost V-shaped side faces of the link-plates or the transverse-plate, in the radial direction relative to a chain mounted in a transmission, mate without play as self-locating and self-centering bearing faces during operation while passing through the enveloped arc.

Two cams are thus disposed on at least one longitudinal side of each link-plate, between which cams a V-shaped groove is formed for the accommodation of the long side of the transverse-plates which for this purpose are also provided with matching V-shaped side faces. Since, partly with a view to the symmetry of the link-plates and transverse-plates, in practice it will often be preferable to use both grooves in V-form in each link-plate, this will be assumed in the description which follows. It will be clear to the person skilled in the art that if only one V-shaped groove is used per link-plate the other groove can have, for example, parallel side faces. When the chain is slack or on the straight parts of a taut or operating chain both V-shaped longitudinal sides of the transverse-plates are confined with slight play in the V-grooves of the link-plates. When the chain is assembled the transverse-plates can therefore move slightly in the radial direction at right angles to the direction of the chain before, thanks to the self-locating and self-centering form of the V-shaped faces, one of the long sides of the transverse-plate becomes fixed in the V-grooves of the adjacent set of link-plates of the link concerned. In such a situation the whole radial play is therefore present in the outermost V-groove of the link-plates when the chain is assembled. Theoretically, the play between the two side faces of the outermost V should be equal, because the centring in the innermost V-groove ensures this. This feature of the invention is of essential importance when the chain is passing through the enveloped arc of the two conical pulleys between which the chain is stretched. Since during the passage through the enveloped arc the links in front and behind as a reaction to the pulling force in the chain are subjected to a radially inward-directed force, when resting against the sheaves the link-plates of the link will centre themselves automatically with the V-groove via the transverse-plate relative to the transverse-plate concerned, and the V-groove situated radially inside will be free of play. This phenomenon always occurs in operation because the pre-stressing on the two conical pulleys always exerts a large tensile pre-stressing on the chain, even if no useful couple is passed on and the transmission runs unloaded. While the pulleys are passing through the enveloped arc an often large centrifugal acceleration also acts on the transverse-plates, which also makes a contribution to the firmly centred resting of the transverse-plate against the innermost V-groove of the link-plate. Although when a straight part runs in between the pulleys the radius of curvature passed through by the chain is quickly assumed, and therefore the radial forces also begin to increase rapidly, the transverse-plates have sufficient opportunity to centre themselves in the V-grooves and at the same time to become clamped with their side faces designed as friction faces between the conical pulleys.

A number of the disadvantages of the known chain are eliminated according to the invention. Due to the fact that in theory each transverse-plate bears on all link-plates of the link in question, the surface pressure between them, and thus the wear, will be much lower than in the known chain, so that the service life can also be many times longer. Since the lie of a transverse-plate in the successive grooves of a number of adjacent link-plates per se is a statically overdetermined construction and there are also manufacturing tolerances, in practice after some initial wear and initial adjustment the transverse-plate will essentially be borne on the flanks of the more outward-lying link-plates in the transverse direction of the chain. The bending of the transverse-plates, which is due on the one hand to the clamping of the friction faces between the conical pulleys on the outsides of the short sides of the transverse-plates and, on the other hand, to the action points of the set of link-plates located more towards the centre of the transverse-plate, therefore decreases. Compared with the known chain, however, the power transmission between the chain and each transverse-plate consists of a number of discrete side faces of the V-grooves, and is therefore many times greater.

The second improvement is that each transverse-plate clamped in the radially innermost V-grooves of the link-plates of the chain when the torque is transferred from the driving pulley to the driven pulley no longer changes bearing surface, so that the impacts occurring under these circumstances are totally avoided, and so is the noise and wear occurring in the process.

A similar transmission chain with transverse-plates is known per se from U.S. Patent No. 4,569,671, in which each link-plate is provided only with radially inward-directed cams which enclose between them a groove with parallel sides. One or more transverse-plates fall into this groove. According to this publication, the transverse-plates are confined and centred only by these cams in the lengthwise direction of the chain. This, of course, always takes place with a certain play in the direction of movement of the chain, so that the above-mentioned disadvantage of always changing the bearing surface during the transfer from the driving pulleys to the driven pulleys and vice versa remains. Since the transverse-plates fall with a certain play into the groove between the cams, they can also go out of square to a certain extent relative to the corresponding link-plates of the link in question, so that this disadvantage mentioned earlier is also only partially eliminated. In this case the faces which carry out the actual power transmission between the link-plates and the transverse-plate do, however, have surfaces comparable with those according to the invention, so that this disadvantage of the earlier-mentioned chain is reduced. However, a disadvantage which does remain is that the bearing point of the friction faces of the transverse-plates between the conical pulleys will in many cases lie further radially outwards, and in particular, on a radius approximately corresponding to that on which the hinge pins pass through the enveloped arc, than the bearing faces of the transverse-plates in the groove. This exerts an adverse couple on the transverse-plates relative to the link-plates, which will increase the wear, and in addition exerts and unnecessarily load-imposing torque on the link-plates of each link.

As stated earlier, when the chain runs into a conical pulley the transverse-plate will centre itself and come to rest without play against the faces of the inside V-grooves of the link-plates, which has several advantages, as explained above. However, when the chain is running out of a conical pulley the chain itself will readily follow the path of the straight part, helped by the centrifugal acceleration. However, the transverse-plate, which is clamped between the conical pulleys, will try to rotate with the pulley and will therefore leave the flanks of the innermost V-groove and be drawn out of the conical pulley by the chain via the radially outermost V-grooves, and will move along with the chain. If this occurs, despite the centrifugal acceleration acting on the transverse-plates, the transverse-plate will thereby change its bearing surface between the radially innermost V-groove on running into the conical pulley and the outermost V-groove on running out of a conical pulley. This, of course, depends greatly on the diameter on which the chain runs through each conical pulley. The smaller the radius of the arc passed through over the conical pulley, the greater is the chance of this happening. This is not necessarily a problem per se, because there is lubricating oil between the flanks of the V-grooves which, thanks to the shape of the V-grooves, has a highly damping effect. However, should this phenomenon in some circumstances lead to excessive noise production, then it is advantageous according to a preferred embodiment of the invention to make the apex angle of the V-shaped grooves between 7° and 20°, so that the centring is self-braking. Together with the influence of the centrifugal acceleration, this will cause the transverse-plate to remain lying longer in the radially innermost V-groove, both while leaving an enveloped arc of a conical pulley and while passing through the straight parts. This at least partially eliminates the above-mentioned possible noise production.

A similar transmission chain provided with transverse-plates is known per se from British Patent Application 2,088,517, but these transverse-plates are already clamped over a set of adjacent link-plates of the link concerned during the manufacture of the chain. With this design of the chain there is no possibility of either the transverse-plates or the link-plates being able to locate themselves, let alone centre themselves, relative to the chain in the direction of movement, or in the transverse direction of the chain. This publication also discloses a design with two cams on each longitudinal side of the link-plate, between which (when the chain is assembled) half U-shaped transverse-plates divided through the middle are pressed from both transverse sides in clamping fashion. Besides, these do not form a stable, rigid, shape-retaining structure. This imposes extremely high requirements on the manufacture of this chain disclosed in this British patent application, which will be difficult to adhere to in practice in mass production, while the design is already weak per se.

As explained earlier, in operation the transverse-plates according to the invention will bear centred and free of play into the innermost V-grooves of the link-plates, at least while running through the enveloped arcs of the conical pulleys. Under these conditions, the slanting bearing faces of the transverse-plate in the radially outermost V-grooves of the link-plates have an increased and relatively great play. Tilting of the side of a transverse-plate lying radially outside relative to the corresponding link-plates would cause an inadmissible movement of the innermost long side of the transverse-plate in the radially innermost V-grooves of the link-plates. Since the flanks of the V-groove are both in contact here, this would be a movement accompanied by great friction, which would also cause great wear and would involve an inadmissible heat development. Although the chance of this occurring is slight, the risk of it happening can be reduced considerably according to a preferred embodiment of the invention by making at least the radially outermost V-shaped groove of each link-plate mounted in a chain end in parallel sides, while the long sides of the transverse-plates mating therewith have a corresponding cross-section with parallel sides. Irrespective of the radial position of the transverse-plate in the corresponding link-plates, the parallel flanks of the groove will always maintain a constant play with the parallel faces of the transverse-plate. Although in theory, as a result of the centrifugal acceleration occurring in operation, said parallel sides of the grooves are necessary only in the radially outside grooves, it is advantageous to make both the radially outermost and the innermost grooves in this way. This keeps the link-plate symmetrical, so that mistakes cannot be made during the assembly.

It will be clear to the person skilled in the art that the hinge pins, not described in greater detail, can be either solid round pins or the known "half pins" rolling over each other. The latter have a fixed immovable contact with their rear side in the openings of the link-plates, so that no play or friction and wear occurs there. With their cylindrical faces facing each other they roll without play against each other when the chain is passing from the taut position to the curved position and back.

Further features of the invention will become clear with reference to the appended claims and the following description with reference to the figures showing a preferred embodiment as an example.

FIG. 2 shows on a greatly enlarged scale a partial crosssection of a transmission chain according to the invention.

FIG. 3 shows schematically a cross-section of a transmission chain along the line III—III of FIG. 2 in the position between conical pulleys.

In the following description with reference to the figures, and also in the description above, the following definitions are used for purposes of clarification:

|  | chain (taut) | link-plate (individual) | transverse-plate (individual) |
| --- | --- | --- | --- |
| parallel to running direction | lengthwise direction longitudinal centerline | longitudinal, longside | thickness |
| parallel to hinge pins | transverse | thickness | longitudinal |
| at right angles to lengthwise and transverse direction | radial | width | short side |

Figure 1A:
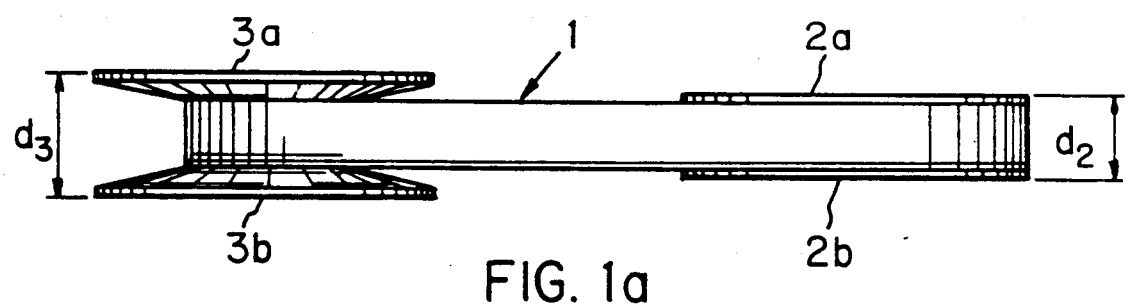
FIGS. 1a and 1b show schematically a continuously variable conical pulley drive according to the state of the art, in which the chain according to the invention can be used.
Figure 1B:
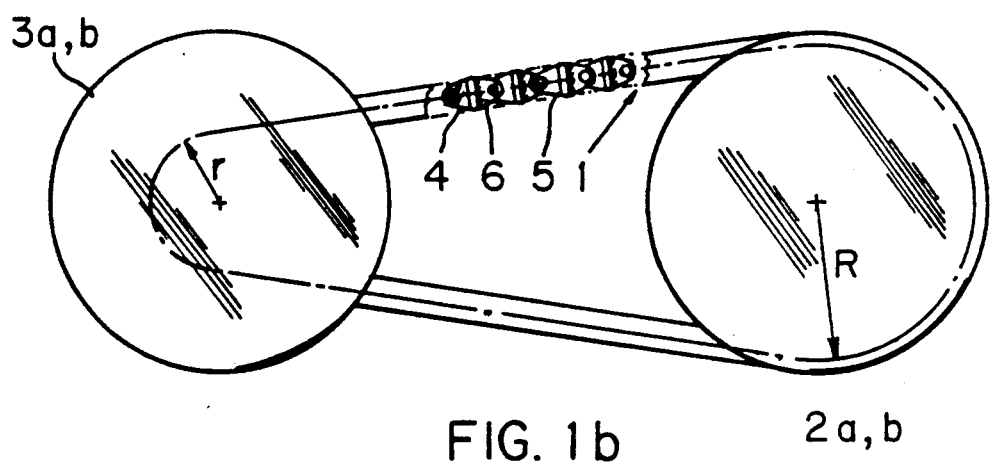

FIGS. 1a and 1b show schematically a continuously variable conical pulley drive of the type according to the invention. The schematically shown chain 1 can be of the type according to the invention described above. The transmission is shown in a position with the maximum transmission ratio, in which the cone-shaped sheaves 2a, 2b of one pulley, the right-hand one in the figures, are brought as close together as possible ($d_2$), so that the chain runs through the enveloped arc on the greatest radius R. The other pulley, the left-hand one in the figures, is shown on the smallest radius r which can be run through by the chain, for which the two conical pulleys 3a, 3b are taken as far apart as possible ($d_3$). The mechanisms required for setting the sheaves are known per se, and are not therefore explained in further detail. It is merely pointed out that the distance of the one set of sheaves is set, for example, hydraulically and in a controllable manner, and that the sheaves of the other pulley are always under a force which presses the conical pulleys towards each other. This means that the transmission chain 1 is always under tensile stress in both parts in all circumstances, both when at a standstill and when in operation, both when idling and when transmitting a useful torque. The greater the transmitted couple, the more the one part (the driving part) is additionally loaded, and the more the other part (the "slack" part) is unloaded. A number of link-plates 4 of the type of transmission chain 1 used are shown schematically, being connected to each other by means of hinge pins 6 to form an endless closed chain. As is usual in this type of chain, each link has a number of link-plates 4 (not shown) disposed next to each other. Schematically shown transverse-plates 5 are mounted in the centre of each set of adjacent link-plates 4 of each link. These transverse-plates are provided with slanting sides which form the friction faces by means of which the chain makes contact via the transverse-plates with the conical surfaces of the conical pulleys. In order to reduce as much as possible the troublesome and undesirable polygon effect which in principle always occurs in chains, the links must have as short a pitch as possible, so that the mutual distance between the transverse-plates 5 is as small as possible. This is achieved in the known manner if a large number of link-plates per link are disposed next to each other, so that the shear load in the hinge pins is distributed over as large a number of cross-sections as possible and the bending stress is reduced. These can then be of smaller diameter, which means that the link-plates can in turn be smaller and the pitch of the chain can be reduced. The limits of reduction are determined here in particular by the production and fitting possibilities. Since with reducing pitch of the chain the number of active transverse-plates increases, the transverse-plates per se do not constitute a limitation to the miniaturization. The number of parts of the transmission chain does increase here, but the polygon effect, and thus the noise level produced in operation, is considerably reduced.

FIG. 2 shows schematically on a greatly enlarged scale three links of a transmission chain according to the invention as they run through the enveloped arc between conical pulleys. It should be remembered here that there is always a pulling force P on the chain, so that while the chain is running through the enveloped arc a radially inward-directed force which presses the chain into the V-grooves between the conical pulleys is exerted on the transverse-plates. Thanks to the friction which goes with this radial force, a torque can be exerted from the chain on the sheaves or vice versa.

Figure 4:
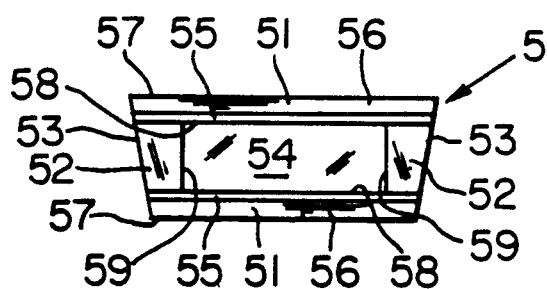
FIG. 4 shows a front view and FIG. 4a shows a side view of a transverse-plate according to the invention.
Figure 4A:
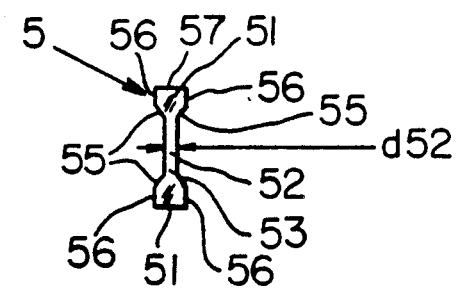
Figure 5:
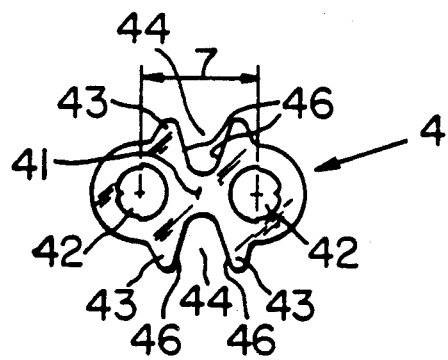
FIG. 5 shows a link-plate in front view and FIG. 5a shows link-plate in side view.
Figure 5A:
Figure 6:
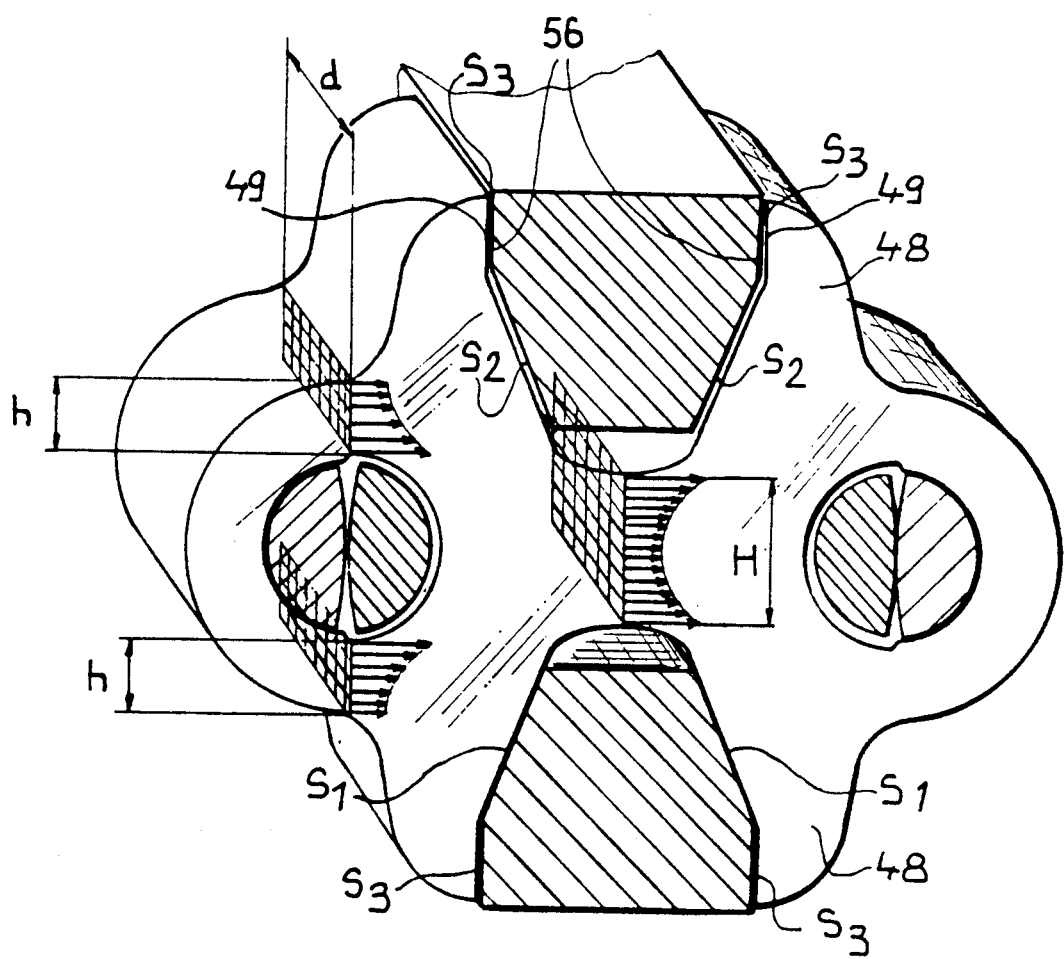
FIG. 6 shows on an enlarged scale details of a link-plate and a transverse-plate according to the invention, in a modified embodiment.

In the following further discussion of FIG. 2 reference is also made to FIGS. 3, 4 and 5 in connection with the detailing of the parts. FIG. 5 shows a link-plate 4, eight of which are fitted, according to the example shown in FIG. 3, next to each other in the chain described by way of example. Each link-plate is essentially oblong with rounded ends, where the openings 42 for allowing through the hinge pins 6 are located. The link assemblies of the chain have a pitch 7 equal to the distance between the centre points of the link-plate openings 42. The long sides of the link-plate are provided on each side with two cams 43 which enclose between them a V-shaped groove 44, the side faces of which are indicated by 46. The body 41 of the link-plate 4 is constricted between the V-shaped grooves 44 facing each other, which will be reverted to later when FIG. 6 is being discussed. The link-plates are made from heat-treatment sheet steel by, for example, fine-blanking or ordinary blanking plus partial finish-grinding, as shown schematically by 45.

A transverse-plate 5 is fitted according to FIGS. 2, 3 round a set of adjacent link-plates as they are fitted in a chain. FIG. 4 shows such a transverse-plate in detail. It is essentially trapezoidal with the parallel sides of the trapezium as long sides 51 and the slanting sides of the trapezium as short sides 52. A rectangular window 54 is disposed symmetrically in each transverse-plate 5, so that the transverse-plate is window-like. The side faces 53 of the short sides 52 are finished with a certain roughness and hardened, in order to serve as friction faces in conjunction with the conical surfaces of the conical pulleys 2 and 3. For the sake of simplicity, the figures do not show that the side faces 53 are slightly kinked or curved in order to concentrate the bearing face between the conical pulleys in a small discrete area, as is generally known. When a transverse-plate is fitted in a chain these discrete friction areas lie in the vicinity of or on the connecting line between the hinge pins of the link concerned. According to the invention, the longitudinal side faces 56 of the transverse-plate 5 are provided with bevelled faces 55 next to the window 54 along the entire length. These faces 55 lie at the same V-angle as the faces 46 of the V-shaped grooves in the link-plates 4 with which they mate in the chain.

In the taut parts of a chain according to FIGS. 1a and 1b the fitted transverse-plates 5 are slightly movable in the transverse direction and in the radial direction on the links with slight play, each of which consists of a number of link-plates fitted adjacent to each other. However, FIG. 2 shows the situation in which the chain is running through the enveloped arc between two conical pulleys. The play $S_1$ between the V-faces 55 of the transverse-plate and the side faces 46 of the radially inward V-groove 44 in the link-plate 4 is now reduced to zero, thanks to the action of the self-locating and self-centring slanting faces of the V, under the influence of the radially inward-directed forces acting on the link-plate and the outward-directed forces acting on the transverse-plate. Both plays $S_1$ are therefore always equal to zero. This means that the radial plays $S_2$ lying on the outside between the V-flanks 46 and 55 are doubled. Due to the fact that in operation the radial inside plays $S_1$ are both always zero, no further relative movement can occur between the transverse-plates 5 and the corresponding link-plates 4, not even as a result of the variation in the transmitted force direction between the driving conical pulleys and the driven conical pulleys. This substantially reduces the noise production and the wear. Another important advantage can be pointed out in the design of the invention compared with known designs, namely, as can be seen clearly from FIG. 2, that the only bearing faces touching each other between the transverse-plate and the link-plates, are the slanting V-faces 46 and 55. Only these therefore have to be wear-resistant and smooth when manufactured, for example through hardening them and grinding them if necessary. The inner face 58 of the window opening 54 in the transverse-plate 5 according to the invention does not have to be machined after blanking, nor do the root curves 47 of the V-grooves in the link-plate. In known designs these faces generally also had to be machined. The short sides 59 of the window opening 54 of the transverse-plates 5 do not have to be machined after blanking either, because, as can be seen from FIG. 3, these faces take no load and at most fulfil a guide function for the outermost link-plates of the chain.

Two different types of chain are generally used for this sort of transmission chain, namely chains with the same number of link-plates from link to link. This means that the longitudinal axis of the chain in fact zigzags a little to and fro from link to link. In this case the rigidity of the chain is the same from link to link but, because the load from link to link does not run precisely along the centre, but is always staggered over a link-plate thickness, the chain under load will have the tendency to go very slightly into an S shape and to wear in an S shape. The other commonly used chain is the symmetrical one, in which the links alternately have n and n+1 link-plates. Here the elasticity from link-plate to link-plate is different, but the centre line remains accurately straight and the wear of the chain will therefore be symmetrical. Both chains have their disadvantages described above, but in practice they are both very useful and are suitable for a long service life. FIG. 3 shows a cross-section through an asymmetrical chain. As can be seen, the transverse-plate in the link shown has considerably greater play at the left-hand side than at the right-hand side, and in the next link of the chain it is precisely the other way round. Since no clamping can occur and the transverse-plates 5 from link to link can locate the correct position between the conical pulleys 2a and 2b on running into the enveloped arc, the window 54 of the transverse-plate has both left and right a play $S_4$ which makes this location possible. This is the case both in the symmetrical chain, and in the asymmetrical chain illustrated.

Yet another advantage of the invention can be pointed out. As a result of providing the slanting V-edges 55 on the transverse-plates, for production reasons it will be preferable to make the central part of the short sides 52 narrower, as can be seen from FIG. 4. This means that if there is grinding of the V-faces 55, the grinding wheel can cover all faces unimpeded. As can be seen from FIG. 2, a play $S_5$ can occur here between the end (viewed in the lengthwise direction) of a link-plate and the next transverse-plate. One thing achieved by this is that when the chain is fitted the confinement of the transverse-plates relative to the link-plates of a link takes place in the transverse direction through the face 41 (FIG. 5) of the link-plate so long as the distance $S_5$ is positive, instead of through the small end surfaces of succeeding link-plates if $S_5$ should be selected negative. The latter case involves a fair amount of additional wear, because the two link-plate ends involved do not need to lie in line with each other and could have sharp edges. It can also be seen that space has been gained either to reduce the pitch and thus the link length yet further and/or to use more sturdily designed hinge pins. The above statement with regard to the distance $S_5$ applies to both types of chain. The gain achieved compared with transverse-plates without narrowing of the short sides according to the prior art is seen clearly from FIG. 2.

FIG. 6 shows a further improved preferred embodiment according to the invention of the mating between the link-plates and the transverse-plates. Here the four cams 43 of the link-plates are extended further to form a cam 48. The V-shaped groove 44 with the side faces 46 between the cams 43 continues between the cam extensions 48 as a groove with parallel side faces 49. The latter confine the parallel side faces 56 with a play $S_3$ on each side. The position of the transverse-plate relative to the link-plate as shown in FIG. 6 corresponds to that of the central link-plate in FIG. 2, in other words, while running through of the enveloped arc between two conical pulleys. This means that the plays $S_1$ at the side of the chain lying radially inside are equal to zero, which means that plays $S_3$ remain between the parallel faces of the cam extensions 48. As is also explained in connection with FIG. 2, at the side lying radially on the outside there is a symmetrical play $S_2$ between the slanting V-faces of the transverse-plate and the V-groove in the link-plate. This play is relatively large, as explained with reference to FIG. 2. However, the plays $S_3$ between the side faces 56 of the transverse-plate and the side faces 49 of the cam extensions 48 remain constant and small. The purpose of this is to prevent the transverse-plate from still tilting a little relative to the link-plate while the track is running into and through between the sheaves. This would, of course, cause great wear at those points where the play $S_1$ is equal to zero. This is prevented by keeping the plays $S_3$ positive, but small. The faces 46 and 49 of the corresponding V-grooves will now have to be ground, while the same applies to the faces 55 and 56 of the transverse-plates.

FIG. 6 also gives an idea of the load distribution occurring in the link-plates. Since in a continuously variable conical pulley drive in which the transmission chain according to the invention is used a relatively great pulling pre-stress always prevails in the chain and is increased further by the couple in the driving part of the chain to be usefully transmitted, this has to be specially allowed for in the dimensioning of the link-plates. For the link-plates are according to the invention cut into by the two V-grooves 44 and the rounded outlets 47 of the V-grooves. Roughly speaking, a distance H of material which is equal to twice the quantity h of material of the link-plates round the hinge pins should remain there. An overall allowance is then made for the shape factors effecting the tensile stress.

Use of the V-grooves for accommodation of the transverse-plates in the link-plates gives yet another advantage, which is that it secures the chain better against running out of square between the conical pulleys. It is known that the type of transmission chain involved sometimes has the tendency to "run crooked" or go out of square, in other words, the hinge pins and the transverse-plates are not precisely at right angles to the longitudinal axis of the chain. This occurs particularly in chains in which the transverse-plates lie in the grooves with permanent play, so that the transverse-plates cannot act in a correcting manner against running out of square. Since according to the invention, however, the plays $S_1$ during passing through of the enveloped arc between the conical pulleys are reduced by force to zero, a correcting restoring couple is therewith exerted on the faces 46 of each link-plate if there is any question of the start of going out of square. It has been found that with the link-plate/transverse-plate combination according to the invention the risk of going out of square has been virtually completely eliminated.

Figure 7:
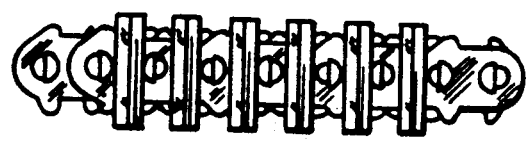
FIG. 7 shows a known transmission chain of a type which shows some similarity to the transmission chain according to the invention.

Finally, FIG. 7 shows a known chain of which only commercial documentation is hitherto known. It shows a certain similarity to the chain according to the invention, because the transverse-plates, in addition to a confinement by their ends between the hinge pins, are confined in the lengthwise direction of the chain between cams on the link-plates. However, unlike the present invention, the link-plates are for this purpose each merely provided with cams at one side of the corresponding transverse-plate. By fitting the link-plates alternately, an interrupted groove with parallel sides is obtained through which the long side of the transverse-plate runs. The transverse-plate is thus supported along its length alternately at its front and rear side, and only by half the number of link-plates. As regards their distance, the parallel sides of the virtual groove are subjected to a summation of tolerances, so that the confinement of the transverse-plates between the alternately provided cams is very inaccurate. The same summation of wear occurs in operation, so that the confinement between the cams is more orienting than position-determining. In addition, the transverse-plates also appear to be confined between the hinge pins themselves, with a different summation of tolerances, which involves the same disadvantages, as discussed earlier in connection with EP-A-0,127,266. It is clear that the advantages achieved with the V-grooves according to the invention when used in this known design would not be achievable as a result of the summation of the many tolerances in this known chain.

As regards the assembly, the assembly of this known chain seems simple, because the link-plates can be pushed into the window of the transverse-plate from both sides, following which the hinge pins are inserted, but mistakes with the link-plates to be fitted alternately do not seem ruled out.

As regards the chain according to the invention, the mechanized assembly sets conditions which can be met through the dimensioning of the link-plates and transverse-plates relative to each other. These are described in the claims. If the preferred embodiment of the invention with V-grooves is used, additional space is gained because the last link-plate can be swung in the slanting position into (out of) the window about a point which is formed by the V-groove which accommodates the narrowed short side 52 of the transverse-plate with play. This additional available space can be used for increasing the fitting space and/or for reinforcing the link-plate and/or the transverse-plate.

I claim:

1. Transmission chain (1) with a number of links closed to form an endless chain for a continuously variable conical pulley drive, comprising in each link a set of laminal link-plates (4) situated parallel and adjacent to each other, and provided with two link-plate openings (42) situated at pitch distance (7) from each other, hinge pins (6, 6a, 6b) running at right angles to the link-plate face and inserted through the adjacent link-plate openings, a link-plate of one link and of the following link being disposed essentially alternately round each hinge pin, while the chain ends are connected to each other to form an endless chain, and also comprising at least one transverse-plate (5) per link, said transverse-plate being essentially of constant thickness and being trapezoidal, and having a rectangular window (54) whose long sides (58) run parallel to the parallel sides (56, 57) of the trapezium, and the short sides (59) of the window being of such length that the adjacent link-plates (4) of a link can be inserted with slight play through the window and are situated at such a distance from each other that the whole set of adjacent link-plates can be accommodated with some play, and in which the two short sides (52) of each transverse-plate (5) form end surfaces (53) which mate as friction faces with the conical surfaces of the conical pulleys, and in which each transverse-plate (5) is confined in the lengthwise direction of the chain relative to the accommodated set of link-plates by two cams (43) per longitudinal side of each link-plate which are situated in the link-plate face, and which project on either side of the centre of the link-plate and form a groove (44) between them, the centre line of which lies at right angles to the centre line of the link-plate, and in that the greatest width of the link-plate measured between a top of a first cam and a top of a second cam opposite said first cam is smaller than an oblique distance through the window in the transverse-plate during fitting (removal) of a set of link-plates in (from) the window of the transverse-plate, while all the link-plates but one are pushed slantingly or vertically next to and against each other to one side of the window in the transverse-plate and the last link-plate can be fed or swung in the above-mentioned slanting position parallel to itself into (out of) the window characterized in that at least one of the grooves in the link-plates widens in a v-shape towards the top of the cams, and in that the faces (56) of at least one of the long sides (51) of each transverse-plate (5) are provided with matching v-shaped side faces (55), while the innermost v-shaped side faces (46) of the link-plates (4) and the transverse-plate (5), in the radial direction relative to a chain mounted in a transmission, mate without plate as self-locating and self-centering bearing faces during operation while passing through an enveloped arc in said conical pulleys.

2. Transmission chain according to claim 1, characterized in that the apex angle of the V-shaped grooves (44) is between 7° and 20°, so that the centring is self-braking.

3. Transmission chain according to claim 1 or 2, characterized in that the two V-shaped grooves (44) of each link-plate (4) run through so far to the link-plate centre line that the remaining distance (H) between the bottoms (47) of the two V-shaped grooves facing each other is essentially equal to twice the radial material thickness (h) of each link-plate round the link-plate openings (42).

4. Transmission chain according to claim 1 or 2 and characterized in that at least the radially outermost V-shaped groove of each link-plate fitted in a chain ends in parallel sides (49), and in that the long sides (57) of the transverse-plates (5) mating therewith have cross-sections corresponding therewith, all this in such a way that with self locating V-shaped bearing faces resting against each other ($S_1$) between the link-plates and the transverse-plate the radially outermost combination of the long side (56) of the transverse-plate (5) with the outermost V-grooves of the link-plates forms a confinement with slight play ($S_3$) between the parallel sides (56, 49).

5. Transmission chain according to claim 1 or 2, characterized in that starting from any fitted link with a set of link-plates and the two fitted hinge pins, the adjacent front and rear link-plates of the neighbouring links fitted round the front and rear hinge pin have such a distance ($S_4$) between them that it is greater than the local material thickness ($dS_2$) of the transverse-plate (5) fitted at that point, all this in such a way that thereby each successive transverse-plate on the fitted chain has play alternately in one and the other transverse direction, in order to guide the chain correctly in the centre plane of the V-groove of the conical pulley drive.

* * * * *

UNITED STATES PATENT AND TRADEMARK OFFICE
CERTIFICATE OF CORRECTION

PATENT NO. : 4,998,908

DATED : March 12, 1991

INVENTOR(S): Martinus H. Cuypers

It is certified that error appears in the above-identified patent and that said Letters Patent is hereby corrected as shown below:

Column 1 Line 22 "linkplates" should read --link-plates--.

Column 1 Line 31 after "of" insert --link-plates characterized by two cams per longitudinal side of each--.

Column 1 Line 38 "ablique" should read --oblique--.

Column 1 Lines 39-40 after "fitting" insert --(removal)--.

Column 1 Line 40 after "in" insert --(from)--.

Column 1 Lines 44-45 "abovemen-tioned" should read --above-mentioned--.

Column 3 Line 55 "centring" should read --centering--.

Column 5 Line 12 "and" should read --an--.

UNITED STATES PATENT AND TRADEMARK OFFICE
CERTIFICATE OF CORRECTION

PATENT NO. : 4,998,908
DATED : March 12, 1991
INVENTOR(S) : Martinus H. Cuypers

It is certified that error appears in the above-identified patent and that said Letters Patent is hereby corrected as shown below:

Column 6 Line 57 "crosssection" should read --cross-section--.

Column 10 Line 43 "S:" should read --$S_1$--.

Claim 1 Line 1 Column 13 "plate" should read --play--.

Claim 4 Line 2 Column 14 "self locating" should read --self-locating--.

Signed and Sealed this

Eighth Day of December, 1992

Attest:

DOUGLAS B. COMER

Attesting Officer

Acting Commissioner of Patents and Trademarks